DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 8, 1970

878 O.G. 239

T878,002

PROCESS FOR PRODUCING MINUTE CAPSULES

Herbert S. Elins and Nicholas L. Weeks, both % Eastman Kodak Co., Kodak Park Division, Rochester, N.Y. 14650

Filed Jan. 22, 1969, Ser. No. 793,171
**Int. Cl. G03c *1/76***
U.S. Cl. 96—67
No Drawing. 10 Pages Specification

Minute capsules can be prepared by incorporating an oil-soluble acid percursor, e.g., n-butyl oxalate, into an oil, the acid precursor being capable of hydrolyzing to form an acid when contacted by water at a temperature below about 100° C., mixing the oil with a continuous aqueous phase containing an alkali-soluble acid-insoluble cellulose ether, e.g., cellulose ether phthalate, to form a discontinuous oil phase, e.g., oil droplets, within said continuous aqueous phase. An alkali-soluble acid-insoluble cellulose ether encasing wall forms at the interface of the two phases. This is caused by the acid which is produced by the hydrolysis of the oil-soluble acid precursor contacting the alkali-soluble acid-insoluble cellulose ether contained in the continuous aqueous phase. These minute capsules can be employed in photographic elements and emulsions, e.g., they can contain photographic silver halide processing agents.